US010315463B2

(12) United States Patent
Rannoux et al.

(10) Patent No.: US 10,315,463 B2
(45) Date of Patent: Jun. 11, 2019

(54) METHOD FOR SYNTHESISING A POLYMER HAVING A HYDROXYARYL GROUP, PRODUCT OBTAINED USING SAID METHOD AND COMPOSITION CONTAINING SAME

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Claire Rannoux, Morges (CH); Rachid Matmour, Clermont-Ferrand (FR); Cédric Loubat, Castries (FR); Camille Chatard, Castries (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 40 days.

(21) Appl. No.: 15/523,857

(22) PCT Filed: Oct. 22, 2015

(86) PCT No.: PCT/EP2015/074516
§ 371 (c)(1),
(2) Date: May 2, 2017

(87) PCT Pub. No.: WO2016/071120
PCT Pub. Date: May 12, 2016

(65) Prior Publication Data
US 2018/0304684 A1  Oct. 25, 2018

(30) Foreign Application Priority Data

Nov. 4, 2014 (FR) ..................... 14 60620

(51) Int. Cl.
| | |
|---|---|
| *B60C 1/00* | (2006.01) |
| *C08F 36/04* | (2006.01) |
| *C08L 19/00* | (2006.01) |
| *C08L 53/02* | (2006.01) |
| *C08F 36/14* | (2006.01) |
| *C08F 36/20* | (2006.01) |
| *C08F 30/02* | (2006.01) |
| *C08C 19/06* | (2006.01) |
| *C08F 136/08* | (2006.01) |
| *C08C 19/24* | (2006.01) |
| *C08C 19/40* | (2006.01) |
| *C08F 36/06* | (2006.01) |
| *C08F 36/08* | (2006.01) |

(52) U.S. Cl.
CPC ............ *B60C 1/0016* (2013.01); *C08C 19/06* (2013.01); *C08C 19/24* (2013.01); *C08C 19/40* (2013.01); *C08F 30/02* (2013.01); *C08F 136/08* (2013.01); *C08F 36/045* (2013.01); *C08F 36/06* (2013.01); *C08F 36/08* (2013.01); *C08F 36/20* (2013.01)

(58) Field of Classification Search
None
See application file for complete search history.

(56) References Cited

U.S. PATENT DOCUMENTS

| | | | |
|---|---|---|---|
| 8,871,871 B2 * | 10/2014 | Pan | ................. C08C 19/44 525/326.5 |
| 2010/0286348 A1 | 11/2010 | Pan et al. | |
| 2015/0299367 A1 | 10/2015 | Matmour et al. | |

FOREIGN PATENT DOCUMENTS

| | | |
|---|---|---|
| CN | 101959903 A | 1/2011 |
| EP | 2423239 A1 | 2/2012 |
| EP | 2935341 A1 | 10/2015 |
| FR | 3015488 A1 | 6/2015 |
| WO | 2009086490 A2 | 7/2009 |
| WO | 2011002994 A2 | 1/2011 |
| WO | 2013192159 A1 | 12/2013 |

OTHER PUBLICATIONS

International Search Report dated Jan. 11, 2016.
European Polymer Journal 37 (2001) 1297-1313; Daniel Derouet, et al.: Chemical modification of 1,4-polydienes by di (alkyl or aryl)phosphates.
Angew. Chem. Int. Ed. 2010, 49, 1540-1573; Charles E. Hoyle, et al.: Thiol-Ene Click Chemistry.
Journal of Polymer Science: Part A: Polymer Chemistry, vol. 42, 5301-5338 (2004); Charles E. Hoyle, et al., Thiol-Enes: Chemistry of the Past with Promise for the Future.
Polym. Chem., 2010, 1, 17-36; Andrew B. Lowe, Thiol-ene "click" reactions and recent applications in polymer and materials synthesis.

* cited by examiner

*Primary Examiner* — Tae H Yoon
(74) *Attorney, Agent, or Firm* — Dickinson Wright PLLC

(57) ABSTRACT

The invention relates to a process for the synthesis of a polymer bearing one or more pendant hydroxyaryl groups, comprising the reaction of a polymer bearing at least one epoxide functional group with a nucleophilic compound simultaneously bearing the hydroxyaryl group and a nucleophilic functional group selected from the group consisting of the phosphonic acid functional group and its ionic form.

34 Claims, No Drawings

METHOD FOR SYNTHESISING A POLYMER HAVING A HYDROXYARYL GROUP, PRODUCT OBTAINED USING SAID METHOD AND COMPOSITION CONTAINING SAME

This application is a 371 national phase entry of PCT/EP2015/074516, filed 22 Oct. 2015, which claims benefit of French Patent Application No. 1460620, filed 4 Nov. 2014, the entire contents of which are incorporated herein by reference for all purposes.

BACKGROUND

1. Technical Field

The present invention relates to polymers, in particular elastomers, bearing pendant hydroxyaryl groups and to their process of preparation. The present invention also relates to rubber compositions containing such polymers for the purpose in particular of an improvement in the dispersion of the fillers within the polymers.

2. Related Art

In the field of the manufacture of tires and in particular of the formulation of rubber compositions in contact with the ground, known as treads, there is a continual search for means for improving the dispersion of the fillers within the polymers and thus improving the properties of reinforcement of the rubber composition containing them. One of the means for achieving this result is the use of coupling agents capable of establishing interactions between the polymer and the filler. Another means for achieving it is to use polymers, the structure of which is modified with the aim of obtaining a good interaction between the polymer thus modified and the filler, whether it is carbon black or a reinforcing inorganic filler.

The modification of the structure of the polymers can be carried out by introduction of a functional group which is reactive with regard to the filler, at any point in its synthesis by various known means. Thus, the functional group can be introduced into the structure of the polymer at the time of the initiation of an anionic polymerization, when the polymerization initiator bears this functional group. The functional group will be borne at the chain end on conclusion of the synthesis. The functional group can also be introduced at the chain end of a polymer by reaction of a living polymer with a functionalization agent. The functional group can also be borne by one of the polymerized monomers.

It is these modification approaches with which the authors of Applications WO2009/086490 A2 and WO2011/002994 A2 were concerned in order to introduce at least one hydroxyaryl group within a diene elastomer in order to improve the dispersibility of the reinforcing filler in an elastomer matrix.

This is because WO2009/086490 A2 describes a method for synthesizing polymers functionalized with at least one aryl group substituted by at least one OR functional group, R being hydrolysable. The substituted aryl group can be introduced during the initiation stage, during the anionic polymerization or during the termination (by choosing appropriate initiators, monomers or functionalization agents).

WO2011/002994 A2 describes a method for synthesizing polymers bearing pendant hydroxyaryl groups. This method consists in copolymerizing, by the radical route, monomers comprising at least one comonomer bearing the protected hydroxyaryl group.

However, these synthesis methods make it possible to introduce only a single functional group into the structure of the polymer, when the functionalization is carried out at the initiation or the termination of the polymerization, unless coupling or star-branching agents or at least bifunctional initiators are used. This modification to the polymer in addition imposes the need to prepare beforehand polymerization initiators or functionalization agents, the hydroxyaryl groups of which are protected. This also results in an additional deprotection stage at the end of the synthesis process.

Furthermore, the methods of synthesis by copolymerization which make it possible to introduce several pendant hydroxyaryl groups resort to specific comonomers bearing the hydroxyaryl group. Here again, the synthesis of the functional polymer imposes the need to protect the hydroxyl functional groups of the hydroxyaryl groups of the comonomer. The protection of the hydroxyl functional groups of the comonomer adds a stage which will go hand-in-hand with another stage on conclusion of the synthesis process, that of deprotection of the same functional groups. Furthermore, the comonomers bearing a hydroxyaryl group are not readily available, indeed even unavailable.

In order to have a real benefit related to the reactivity of the hydroxyaryl groups of a polymer comprising them for the purpose of a significant modification to its reinforcing properties, it appears desirable to have several pendant hydroxyaryl groups.

Consequently, the technical problem which is posed with respect to the prior art is to provide a process which makes possible the synthesis of polymer, in particular diene polymer, bearing one or more pendant hydroxyaryl groups which overcomes the disadvantages of the earlier processes.

SUMMARY

The present invention makes it possible to solve this problem by providing a process for the synthesis of a polymer bearing one or more hydroxyaryl groups, which process makes it possible to introduce, in a simple and controlled manner, one or more pendant hydroxyaryl groups, without resorting to comonomers bearing a hydroxyaryl group which have in particular the disadvantages of requiring additional stages of protection and deprotection of the hydroxyl functional group and which are not or not readily available commercially.

Thus, a subject-matter of the invention is a process for the synthesis of a polymer bearing at least one pendant hydroxyaryl group, which process comprises the reaction of a starting polymer bearing at least one epoxide functional group with a nucleophilic compound simultaneously bearing the hydroxyaryl group and bearing a nucleophilic functional group selected from the group consisting of the phosphonic acid functional group and its ionic form.

Another subject-matter of the invention is the polymer, in particular elastomer, more particularly diene elastomer, bearing at least one pendant hydroxyaryl group capable of being obtained by the synthesis process in accordance with the invention.

Another subject-matter of the invention is a reinforced rubber composition based at least on a reinforcing filler and on the polymer in accordance with the invention.

The invention also relates to a tire, one of the constituent elements of which comprises the rubber composition in accordance with the invention.

DETAILED DESCRIPTION EXAMPLE EMBODIMENTS

In the present description, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

In the present description, the expression "hydroxyaryl group", with reference to the group borne by the nucleophilic compound or by the polymer, is understood to mean an aryl group bearing at least one hydroxyl functional group directly bonded to a carbon of the benzene ring, the aryl group being or not being substituted on at least one other carbon of the benzene ring.

A subject-matter of the invention is thus a process for the synthesis of a polymer bearing at least one pendant hydroxyaryl group, which process comprises the reaction of a starting polymer bearing at least one epoxide functional group with a nucleophilic compound.

In the present description, "at least one group" is understood to mean one or more groups.

In the present description, "at least one functional group" is understood to mean one or more functional groups.

"Epoxide functional group" is understood to mean the 3-membered ring formed by one oxygen atom and two carbon atoms, it being possible for the carbon atoms of the ring to be substituted.

According to the invention, the two carbon atoms of the epoxide functional group are in the main chain of the starting polymer or else the epoxide functional group is pendant, that is to say in a pendant group of the chain of the starting polymer. In the present description, the expression "pendant group" is understood according to the definition given by IUPAC, PAC, 1996, 68, 2287.

In the continuation of the disclosure of the invention, the designation "the epoxide functional group" is used to denote the at least one epoxide functional group, that is to say one or more epoxide functional groups.

In the continuation of the disclosure of the invention, the designation "the hydroxyaryl group" is used to denote the at least one hydroxyaryl group, that is to say one or more hydroxyaryl groups.

In the continuation of the disclosure of the invention, the designation "the starting polymer" denotes the polymer bearing the epoxide functional group and of use for the requirements of the synthesis process in accordance with the invention.

According to any one of the embodiments of the invention, preferably the epoxide functional group is attached to the polymer chain elsewhere than at the end of the polymer chain.

According to any one of the embodiments of the invention, the starting polymer preferably bears several epoxide functional groups.

According to any one of the embodiments of the invention, the starting polymer can be an elastomer, a liquid polymer or a thermoplastic polymer, whether block, alternating or random.

In the present patent application, liquid polymer is understood to mean a polymer which, at ambient temperature (23° C.), takes the shape of the container which contains it but the volume of which is predetermined.

An essential characteristic of the starting polymer of use for the requirements of the synthesis process in accordance with the invention is that it bears the epoxide functional group. The introduction of epoxide functional group into a polymer chain can be readily accessible in a synthesis stage. There exist, for example, two different synthesis principles. The epoxide functional group can be introduced by at least one of the constituent monomers of the polymer or by the postpolymerization modification of the polymer. Such polymers bearing one or more epoxide functional groups and the processes for obtaining them are well known to a person skilled in the art and for some commercially available.

According to a first alternative of the invention, the (that is to say, one or more) epoxide functional group is pendant.

According to a first alternative form of the first alternative of the invention, the polymer bearing the pendant epoxide functional group is a polymer at least of a first monomer bearing the epoxide functional group, preferably one epoxide functional group. It is clearly understood in the present invention that the first monomer can be a mixture of monomers bearing the epoxide functional group, preferably one epoxide functional group.

According to the first alternative form, the synthesis of the polymer bearing the pendant epoxide functional group is preferably carried out by radical polymerization, according to conventional processes known to a person skilled in the art, such as emulsion, solution, suspension or bulk polymerization.

The radical polymerization is carried out at temperatures varying from −10° C. to 200° C., preferably from 0 to 100° C., the temperature being chosen by a person skilled in the art taking into account in particular the reactivity of the polymerization medium and its concentration.

The polymerization initiator can be any conventional radical polymerization initiator, in particular, by way of example, an organic peroxide, such as benzoyl peroxide, lauroyl peroxide, tert-butyl hydroperoxide, cumyl hydroperoxide, para-menthyl hydroperoxide, di(tert-butyl) peroxide or dicumyl peroxide. Furthermore, the radical polymerization initiators can also include peracids and their esters, such as peracetic acid and potassium persulphate. Each radical polymerization initiator can be used alone or in combination with at least one other radical polymerization initiator.

Recourse may also be had, as radical polymerization, to controlled radical polymerization, which makes possible a high degree of control of the macrostructure and of the microstructure of the polymer. Controlled radical polymerization is known to a person skilled in the art and is described in numerous works. Controlled radical polymerizations include, for example, atom transfer radical polymerization (ATRP), nitroxide-mediated polymerization (NMP) or reversible addition-fragmentation chain-transfer (RAFT) polymerization.

In the reaction medium of radical polymerization, transfer agents, such as mercaptans, in particular tert-dodecyl mercaptan or n-dodecyl mercaptan, or such as carbon tetrachloride or also di- or triterpene, can also be used, alone or in combination.

For a radical polymerization carried out in emulsion, the surfactants employed in the emulsion polymerization can be anionic, cationic or nonionic, or amphoteric entities. They can be used alone or in combination.

For a radical polymerization carried out in suspension, the stabilizing agents employed in the suspension polymerization can, for example and non-exhaustively, be poly(vinyl alcohol), poly(sodium acrylate) or hydroxyethylcellulose.

For a radical polymerization, whether in solution, in suspension, in bulk or in emulsion, the monomers, the polymerization initiator and also the other constituents of the polymerization medium can be introduced into the reactor in a single charge at the start of the polymerization or continuously or sequentially throughout the polymerization.

The radical polymerization is carried out conventionally under an inert atmosphere, for example under nitrogen or under argon. The typical duration of the polymerization is between 15 min and 48 h, more commonly between 1 h and 24 h.

According to one embodiment of the first alternative form, the polymer bearing the pendant epoxide functional group is a polymer at least of a first monomer bearing the epoxide functional group and of a second monomer.

The second monomer can be a vinyl monomer chosen from ethylene, α-olefins, (meth)acrylonitrile, (meth)acrylates, vinyl esters of carboxylic acids, vinyl alcohol, vinyl ethers and the mixtures of these monomers.

Suitable as α-olefins are, for example, α-monoolefins, conjugated dienes and non-conjugated dienes.

Suitable as α-monoolefins are, for example, alkenes and vinylaromatic (vinylarene) compounds. Mention may be made, as alkenes, of those having from 3 to 12 carbon atoms, in particular propylene.

Mention may be made, as vinylaromatic compounds, of those having from 8 to 20 carbon atoms, such as, for example, styrene, ortho-, meta- or para-methylstyrene, para-(tert-butyl)styrene, α-methylstyrene, the "vinyltoluene" commercial mixture, vinylmesitylene, divinylbenzene and vinylnaphthalene, preferably styrene.

Suitable as conjugated dienes are, for example, those having from 4 to 15 carbon atoms, such as, for example, 1,3-butadiene, 2-methyl-1,3-butadiene (isoprene), 2,3-di ($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene or 1,3-pentadiene, preferably 1,3-butadiene, isoprene and their mixture.

Suitable as non-conjugated dienes are, for example, those having from 5 to 12 carbon atoms, such as, in particular, 1,4-hexadiene, vinylnorbornene, ethylidenenorbornene, norbornadiene and dicyclopentadiene.

Suitable as (meth)acrylonitrile are acrylonitrile and methacrylonitrile.

Mention may be made, as (meth)acrylates, that is to say acrylates or methacrylates, of acrylic esters derived from acrylic acid or methacrylic acid with alcohols having from 1 to 12 carbon atoms, such as, for example, methyl acrylate, ethyl acrylate, propyl acrylate, n-butyl acrylate, isobutyl acrylate, 2-ethylhexyl acrylate, methyl methacrylate, ethyl methacrylate, n-butyl methacrylate and isobutyl methacrylate.

Mention may be made, as vinyl esters of carboxylic acids, for example, of vinyl acetate and vinyl propionate, preferably vinyl acetate.

Suitable as vinyl ethers are, for example, those for which the R' group of the ether functional group OR' contains from 1 to 6 carbon atoms.

According to a preferred embodiment of the first alternative form, the second monomer is ethylene, 1,3-butadiene, isoprene, a mixture of butadiene and of isoprene or styrene.

According to a specific embodiment of the first alternative form, the polymer bearing the pendant epoxide functional group is a polymer at least of a first monomer bearing the epoxide functional group, of ethylene or of an α-olefin and of a third monomer. The third monomer is chosen from vinyl monomers as defined above, it being known that it is distinct from the second monomer. Preferably, the third monomer is a vinyl ester, in particular vinyl acetate, or an alkyl methacrylate, the alkyl having from 1 to 12 carbon atoms, or also a vinylaromatic compound, in particular styrene.

According to any one of the embodiments of the first alternative form, the first monomer bearing the epoxide functional group is preferably a monomer bearing an epoxide functional group, more preferably a glycidyl group, more preferably still a glycidyl ester of an α,β-unsaturated carboxylic acid, better still a glycidyl ester of methacrylic acid, acrylic acid or itaconic acid.

According to a particularly preferred embodiment of the first alternative form, the polymer bearing the pendant epoxide functional group is a terpolymer of ethylene or α-olefin, of vinyl acetate and of glycidyl (meth)acrylate or a terpolymer of ethylene or α-olefin, of an alkyl (meth)acrylate, the alkyl having from 1 to 17 carbon atoms, and of glycidyl (meth)acrylate. Very particularly suitable as terpolymer is the terpolymer of ethylene, of vinyl acetate and of glycidyl methacrylate, the synthesis of which is, for example, described in Patent Application WO 2013192159.

Mention may be made, as example of copolymers or terpolymers of use for the requirements of the synthesis process in accordance with the invention as starting polymer, for example, of the "Lotader" commercial terpolymers from Arkema, in particular "Lotader AX8840" and "Lotader AX8900".

According to a second alternative form of the first alternative of the invention, the polymer bearing the pendant epoxide functional group is obtained by the postpolymerization modification of an unsaturated polymer by an epoxidized compound. "Unsaturated polymer" is understood to mean, in the present patent application, a polymer which comprises carbon-carbon double bonds. The principle of the modification of the unsaturated polymer rests on the reaction of the epoxidized compound with at least one carbon-carbon double bond of the unsaturated polymer. These epoxidized compounds comprise, besides the epoxide functional group, a group which is reactive with regard to a carbon-carbon double bond via a reaction known to a person skilled in the art.

Mention may be made, as known reaction, of the Diels-Alder reaction, it being possible for the epoxidized compound to be the diene or the dienophile. In the first case, where the epoxidized compound is the diene, the epoxidized compound can be a diene bearing an epoxide functional group. In the second case, where the dienophile epoxidized compound is a monoolefin, the unsaturated polymer to be modified contains conjugated carbon-carbon double bonds. Polymers containing conjugated carbon-carbon double bonds can be obtained by the polymerization of triene monomers, in particular alloocimene, as is described, for example, in Application EP 2 423 239 A1.

Mention may also be made of the hydrosilylation reaction of a hydrosilane bearing an epoxide functional group, in particular (3-glycidoxypropyl)tetramethyldisiloxane, as is, for example, described in Patent Application FR 13/62946.

Mention may also be made of the radical grafting reaction of a thiol, the thiol bearing an epoxide functional group, as is described, for example, in the following publications: Angew. Chem. Int. Ed., 2010, 49, 1540-1573; J. Polym. Sci.: Part A: Polym. Chem., 2004, 42, 5301-5338; Polym. Chem., 2010, 1, 17-36; FR 12/62470).

The unsaturated polymer can have any microstructure. The unsaturated polymer can, for example, be a block, random, sequential or microsequential polymer and be prepared in dispersion, in emulsion or in solution; it can be coupled and/or star-branched or else functionalized with a coupling and/or star-branching or functionalization agent. The unsaturated polymer, in particular diene polymer, can be obtained according to conventional polymerization techniques (anionic polymerization, coordination catalytic polymerization, radical polymerization, and the like) well known to a person skilled in the art.

The unsaturated polymer according to the invention can be selected from the group consisting of thermoplastic polymers, liquid polymers, elastomers and the mixtures of these.

The unsaturated polymer is preferably an elastomer, more preferably a diene elastomer.

It should be remembered that diene elastomer should be understood as meaning an elastomer which results at least in part (i.e., a homopolymer or a copolymer) from diene monomers (monomers bearing two conjugated or non-conjugated carbon-carbon double bonds).

Diene elastomer is understood more particularly to mean:

(a) any homopolymer of a conjugated diene monomer having from 4 to 12 carbon atoms;

(b) any copolymer of a conjugated diene monomer, in particular any copolymer of a conjugated diene monomer and of a monoolefin, such as ethylene or an α-monoolefin, the conjugated diene monomer having from 4 to 12 carbon atoms;

(c) any homopolymer of a non-conjugated diene monomer having from 5 to 12 carbon atoms;

(d) any copolymer of a non-conjugated diene monomer, in particular any copolymer of a non-conjugated diene monomer and of a monoolefin, such as ethylene or an α-monoolefin, the non-conjugated diene monomer having from 5 to 12 carbon atoms;

(e) a mixture of the polymers defined in (a) to (d).

According to a preferred embodiment of the second alternative form, the unsaturated polymer is a diene elastomer selected from the group consisting of polybutadienes, polyisoprenes, butadiene copolymers, isoprene copolymers and their mixtures.

According to a second alternative of the invention, the (that is to say, one or more) epoxide functional group borne by the starting polymer is in the main chain of the starting polymer. According to this alternative, the two carbon atoms of the epoxide functional group are in the main chain of the starting polymer.

According to one embodiment of the second alternative, the starting polymer bearing the epoxide functional group in its main chain is a polymer containing 1,4-diene units, a portion of which is epoxidized.

The polymers containing 1,4-diene units are polymers well known to a person skilled in the art. They can be obtained by anionic polymerization, by radical polymerization or by polymerization initiated by a Ziegler-Natta catalyst or by a metallocene. The 1,4-diene units result from the insertion of a 1,3-diene monomer according to a 1,4 insertion into the polymer chain. Suitable as conjugated 1,3-diene monomers are, for example, those having from 4 to 15 carbon atoms, such as, for example, 1,3-butadiene, 2-methyl-1,3-butadiene (isoprene), 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene or 1,3-pentadiene, preferably 1,3-butadiene and isoprene.

An epoxidized 1,4-diene unit can be obtained by epoxidation of the double bond present in the 1,4-diene unit. The epoxidation of carbon-carbon double bonds, in particular present in the 1,4-diene units of a polymer, is a reaction well known to a person skilled in the art. The epoxidation can be carried out by processes based on chlorohydrin or bromohydrin or processes based on hydrogen peroxides, on alkyl hydroperoxides or on peracids (such as peracetic acid or performic acid). Polymers containing epoxidized 1,4-diene units are commercially available, such as, for example, epoxidized synthetic polyisoprenes or epoxidized natural rubbers.

According to a preferred embodiment of the second alternative, the 1,4-diene units, a portion of which is epoxidized, are 1,4-butadiene or 1,4-isoprene units.

According to a more preferred embodiment of the second alternative, the starting polymer containing 1,4-diene units, a portion of which is epoxidized, results from the epoxidation of a polymer selected from the group of diene polymers consisting of polybutadienes, polyisoprenes, 1,3-butadiene copolymers, isoprene copolymers and the mixtures of these polymers.

The polymer used in the epoxidation reaction in order to result in the starting polymer containing 1,4-diene units, a portion of which is epoxidized, can be an elastomer, a thermoplastic polymer or also their mixture. If a copolymer is concerned, it can be random, alternating or block.

According to any one of the embodiments of the invention, the starting polymer which contains the epoxide functional group can be an elastomer or a thermoplastic, whether block, alternating or random.

The molar content of epoxide functional group in the starting polymer of use for the requirements of the synthesis process in accordance with the invention can vary to a great extent and is adjusted according to the properties desired for the polymer in accordance with the invention, in particular according to the use which will be made of it. Unless otherwise indicated, it is expressed with respect to 100 mol of monomer units constituting the starting polymer. When the molar content of epoxide functional group is less than or equal to 0.1 and when the nucleophilic compound bears a hydroxyaryl group, the maximum molar content of pendant hydroxyaryl group on the polymer in accordance with the invention will be at most 0.1 mol per 100 mol of monomer units constituting the polymer in accordance with the invention, which implies that the targeted technical effect of improving the dispersion of a reinforcing filler within a modified polymer risks being insufficient. This is why the molar content of epoxide functional group in the starting polymer is advantageously at least 0.1. Preferably, it varies within a range extending from 0.1 to 100, more preferably from 0.1 to 80, more preferably still from 0.1 to 50, in particular from 0.1 to 20. These preferred ranges of the molar content of epoxide functional group can be applied to any one of the embodiments of the invention.

The other essential compound of the synthesis process of the invention is a nucleophilic compound. The nucleophilic compound is a compound bearing both the hydroxyaryl group and a nucleophilic functional group selected from the group consisting of the phosphonic acid functional group and its ionic form.

According to a preferred embodiment of the invention, the hydroxyaryl group is an aryl group which bears two hydroxyl functional groups directly bonded to the benzene ring, preferably vicinal functional groups. Two vicinal functional groups is understood to mean two functional groups which are borne by carbons of the benzene ring which are adjacent. In other words, one hydroxyl functional group is in the ortho position with respect to the other hydroxyl functional group.

Phosphonic acid functional group is understood to mean the —P(O)(OR)(OH) group, R being H or a carbon-based group, preferably an alkyl group, more preferably a $C_1$-$C_{12}$ alkyl group.

According to any one of the embodiments of the invention, the nucleophilic functional group is preferably the phosphonic acid functional group, more preferably the phosphonic monoacid functional group, in particular —P(O)(OR)(OH), R being a carbon-based group, preferably an alkyl group, more preferably a $C_1$-$C_{12}$ alkyl group.

The nucleophilic functional group is capable of reacting with the epoxide functional group of the starting polymer by opening of the epoxide ring. The nucleophilic compound corresponds to the following formula (I):

in which:

A represents a nucleophilic functional group selected from the group consisting of the phosphonic acid functional group and its ionic form, B is a "spacer" representing an atom or a group of atoms forming a connection between A and X, X represents an aryl group bearing from 1 to 5 hydroxyl functional groups directly bonded to the benzene ring, which ring may furthermore be otherwise substituted or unsubstituted.

The B group makes it possible to link together the A group and the X group. Preferably, the B group is a linear, branched or cyclic divalent hydrocarbon chain. This chain can be substituted or interrupted by at least one heteroatom, such as an oxygen, provided that it does not then constitute a nucleophilic group which is reactive with regard to the epoxide functional group. According to any one of the embodiments of the invention, the linear, branched or cyclic hydrocarbon chain, in particular alkylene chain, is preferably a $C_2$-$C_{20}$, more preferably $C_2$-$C_{15}$, chain. According to any one of the embodiments of the invention, said chain can be interrupted by an oxycarbonyl functional group.

X can be represented by the following formula (II):

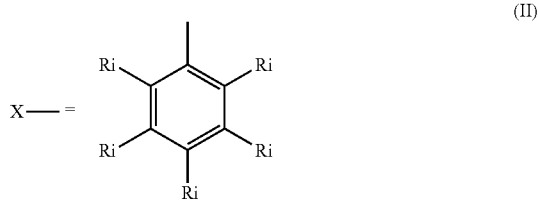

in which the Ri groups, which are identical or different, represent a hydrogen atom or a hydroxyl functional group, at least one of the Ri groups representing a hydroxyl functional group.

According to a preferred embodiment of the invention, the aryl group X is substituted by two hydroxyl functional groups, preferably vicinal functional groups.

According to one embodiment, two Ri groups each represent a hydroxyl functional group, the other Ri groups each representing a hydrogen atom.

According to another embodiment of the invention, the nucleophilic compound corresponds to the formula A-B—X for which X represents an aryl group substituted on two neighbouring carbon atoms by two hydroxyl functional groups.

According to this embodiment, the X— group preferably corresponds to the formula (III):

According to any one of the embodiments of the invention, the nucleophilic compound preferably corresponds to the formula (IV):

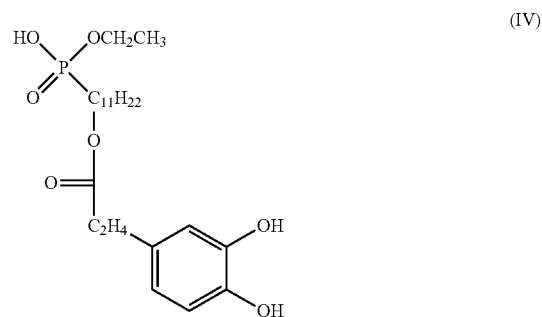

The reaction of the starting polymer bearing the epoxide functional group with the nucleophilic compound can be carried out in bulk or in solution, preferably in solution. The reaction can be carried out under the reaction conditions described by Derouet et al. in Eur. Polym. J., 2001, 37, 1297-1313, which employs the reaction of an epoxidized natural rubber and of a compound bearing a phosphonic acid functional group but devoid of a hydroxyaryl group.

Typically, in order to carry out the reaction, with the nucleophilic compound, of the starting polymer bearing the epoxide functional group, the starting polymer and the nucleophilic compound are dissolved in a nonpolar solvent. Mention may be made, as nonpolar solvent, of hydrocarbon solvents, such as an aliphatic or alicyclic hydrocarbon, for example pentane, hexane, heptane, isooctane, cyclohexane or methylcyclohexane, or an aromatic hydrocarbon, such as benzene, toluene or xylene, and also their mixtures. Use is preferably made of methylcyclohexane or toluene. The amount of solvent is adjusted by a person skilled in the art as a function of the viscosity of the solution of the reaction medium and of the respective solubility of the starting polymer and of the nucleophilic compound in the solvent. Typically, it is adjusted so as to have a concentration by weight of starting polymer of between 1 and 40%, preferably between 2 and 20% and more preferably between 2 and 10% in the solution comprising the starting polymer and the nucleophilic compound.

The introduction of the hydroxyaryl group by a postpolymerization reaction onto a polymer bearing the epoxide functional group makes it possible to avoid the stages of protection and deprotection which are necessary when copolymerization is carried out starting from a monomer bearing the hydroxyaryl group. In addition, the high yield, which can reach at least 90%, of the opening of the epoxide rings makes possible perfect control of the content of pendant hydroxyaryl group introduced.

According to a preferred embodiment of the invention, the process in accordance with the invention results in the synthesis of a polymer in accordance with the invention which contains one or more pendant hydroxyaryl groups.

Another subject-matter of the invention is the polymer bearing one or more pendant hydroxyaryl groups, which polymer is capable of being obtained by the process in accordance with the invention according to any one of its embodiments described above. The polymer in accordance with the invention can be an elastomer, a liquid polymer or a thermoplastic polymer, whether block, alternating or random. Preferably, the polymer in accordance with the invention is an elastomer, better still a diene elastomer.

The polymer in accordance with the invention comprises, on the one hand, a main chain derived from a polymer bearing the epoxide functional group and, on the other hand, at least one side group bearing the hydroxyaryl group, which hydroxyaryl group is connected to the main chain via a divalent group resulting from the reaction of the epoxide functional group with the nucleophilic compound.

According to any one of the embodiments of the invention, the content of pendant hydroxyaryl group preferably ranges from 0.1 to 100, more preferably from 0.1 to 80, more preferably still from 0.1 to 50 and more particularly from 0.1 to 20 mol per 100 mol of monomer units constituting the polymer in accordance with the invention.

According to any one of the embodiments of the invention, the main chain of the polymer in accordance with the invention preferably contains monomer units selected from the group consisting of ethylene units, α-olefins units, (meth)acrylonitrile units, (meth)acrylate units, vinyl ester of carboxylic acid units, vinyl alcohol units and vinyl ether units. Mention may be made, as α-olefin units, of α-monoolefins, such as vinylaromatic compounds, such as styrene, conjugated dienes, such as 1,3-butadiene and isoprene, or non-conjugated dienes.

According to any one of the embodiments of the invention, the polymer in accordance with the invention preferably corresponds to the formula (V):

in which:
P represents the polymer chain derived from the polymer bearing the epoxide functional group,
G represents the side group bearing the hydroxyaryl group, and
i represents the number of pendant hydroxyaryl groups.

A person skilled in the art will understand that this polymer chain of the polymer in accordance with the invention can comprise residual epoxide functional groups. The content of these residual epoxide functional groups depends in particular on the stoichiometry of the reactants, especially on the amount introduced into the reaction medium of nucleophilic compound relative to the molar content of epoxide functional group present on the starting polymer. i depends on the yield of the grafting reaction, on the molar content of epoxide functional group in the starting polymer as well as on the amount of nucleophilic compound. It is a number at least equal to 1. According to any one of the embodiments of the invention, i is strictly greater than 1.

According to any one of the embodiments of the invention, G is represented preferably by the formula (VI):

in which:
D represents a divalent group resulting from the reaction of the epoxide functional group of the starting polymer with the nucleophilic functional group A of the nucleophilic compound;
A, B and X are as described above.

Thus, D can be the divalent group resulting from the reaction of the epoxide functional group of the starting polymer with a nucleophilic functional group selected from the group consisting of the phosphonic acid functional group and its ionic form, preferably with the phosphonic acid functional group.

Preferably, D is the divalent group resulting from the reaction of the epoxide functional group with a nucleophilic functional group selected from the group consisting of the phosphonic acid functional group and its ionic form, preferably with the phosphonic acid functional group. More particularly, D can be the divalent group resulting from the reaction of the epoxide functional group of an epoxidized 1,4-diene unit, preferably of an epoxidized 1,4-butadiene unit or of an epoxidized 1,4-isoprene unit, with a nucleophilic functional group selected from the group consisting of the phosphonic acid functional group and its ionic form, preferably with the phosphonic acid functional group.

The polymers bearing one or more pendant hydroxyaryl groups according to the invention can be used as is or as mixtures with one or more other compounds. The presence of pendant hydroxyaryl groups makes it possible to envisage a use in applications similar to those of modified polymers in general, and polymers bearing hydroxyaryl groups in particular. For example, it is known, in order to optimize the interactions between a diene elastomer and a reinforcing filler within a rubber composition, to modify the nature of the diene elastomers in order to introduce functional groups therein. Thus, the specific structure of the polymer bearing one or more hydroxyaryl groups according to the invention makes it possible to envisage its use in the manufacture of various products based on reinforced rubber when the polymer is a diene elastomer, in particular for the purpose of improving the dispersion of the filler within the elastomer matrix.

Another subject-matter of the invention is thus a rubber composition based at least on a reinforcing filler and on the polymer in accordance with the invention which is preferably an elastomer, more preferably a diene elastomer.

The diene elastomer bearing one or more pendant hydroxyaryl groups is then more particularly selected from polybutadienes, polyisoprenes, butadiene copolymers, isoprene copolymers and their mixtures. Suitable as diene elastomer are, for example, SBRs, BIRs, SIRs, SBIRs, copolymers of butadiene and of (meth)acrylic acid ester, copolymers of isoprene and of (meth)acrylic acid ester, copolymers of butadiene, of styrene and of (meth)acrylic acid ester or copolymers of isoprene, of styrene and of (meth)acrylic acid ester.

The rubber composition in accordance with the invention has the characteristic of comprising a reinforcing filler, for example carbon black, a reinforcing filler other than carbon black, in particular of siliceous type, such as silica, with which is combined, in a known way, a coupling agent, or also a mixture of these two types of filler.

According to alternative forms of the invention, the composition can, besides the polymer in accordance with the invention, comprise at least one conventional diene elastomer.

More particularly suitable as conventional diene elastomer are natural rubber, polybutadienes (BRs), butadiene copolymers, polyisoprenes (IRs), isoprene copolymers and the mixtures of these elastomers. Such copolymers are more preferably selected from the group consisting of copolymers of butadiene and of a vinylaromatic monomer, more particularly the butadiene/styrene copolymer (SBR), isoprene/butadiene copolymers (BIRs), copolymers of isoprene and of a vinylaromatic monomer, more particularly the isoprene/styrene copolymer (SIR), and isoprene/butadiene/styrene copolymers (SBIRs).

The conventional diene elastomer can be star-branched, coupled, functionalized or non-functionalized, in a way known per se, by means of functionalization agents, coupling agents or star-branching agents known to a person skilled in the art.

The rubber compositions in accordance with the invention can also comprise all or a portion of the normal additives generally used in elastomer compositions intended for the manufacture of tires, such as, for example, pigments, protective agents, anti-fatigue agents, plasticizers, reinforcing resins, methylene donors (for example HMT or H3M), a crosslinking system and the mixtures of such compounds.

The use of such a rubber composition is particularly appropriate in the field of tires, in particular for vehicles. This is why a tire, one of the constituent elements of which comprises a rubber composition based on a diene elastomer bearing at least one pendant hydroxyaryl group in accordance with the invention, also constitutes a subject-matter of the invention.

The abovementioned characteristics of the present invention, and also others, will be better understood on reading the following description of several implementational examples of the invention, given by way of illustration and without limitation.

EXAMPLES

1—Measurements Used:
II.1.1—Nuclear Magnetic Resonance (NMR):

The microstructure of the polymers, in particular the content of the different monomer units in the polymers, is determined by NMR analysis. The $^1$H NMR analyses are carried out with a Bruker Avance 300 (300 MHz) spectrometer, QNP $^1$H, $^{31}$P, $^{19}$F and $^{13}$C probe. The samples are dissolved in deuterated chloroform (CDCl$_3$).

1.2—Size Exclusion Chromatography (SEC):

Size exclusion chromatography (SEC) is used. SEC makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the distribution of the molar masses of a polymer. The various number-average molar masses (Mn) and weight-average molar masses (Mw) can be determined from commercial standards and the polymolecularity or polydispersity index (PI=Mw/Mn) can be calculated via a "Moore" calibration.

Preparation of the polymer: There is no specific treatment of the polymer sample before analysis. The latter is simply dissolved, in tetrahydrofuran+1 vol % of diisopropylamine+1 vol % of triethylamine+0.1 vol % of distilled water, at a concentration of approximately 1 g/l. The solution is then filtered through a filter with a porosity of 0.45 μm before injection.

SEC analysis: The apparatus used is a "Waters Alliance" chromatograph. The elution solvent is tetrahydrofuran+1 vol % of diisopropylamine+1 vol % of triethylamine according to the solvent used for the dissolution of the polymer. The flow rate is 0.7 ml/min, the temperature of the system is 35° C. and the analytical time is 90 min. A set of four Waters columns in series, with commercial names "Styragel HMW7", "Styragel HMW6E" and two "Styragel HT6E", is used.

The volume of the solution of the polymer sample injected is 100 μl. The detector is a Waters 2410 differential refractometer and the software for making use of the chromatographic data is the Waters Empower system.

The calculated average molar masses are relative to a calibration curve produced from PSS Ready Cal-Kit commercial polystyrene standards.

2—Preparation of Polymers Bearing Epoxide Groups:

Example 1: Epoxidation of Polyisoprene LIR 30000 with MCPBA

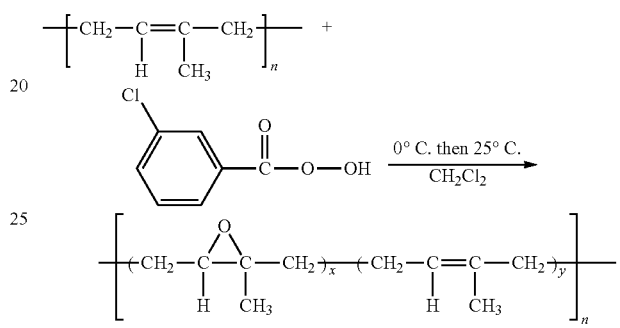

50 g of LIR 30000 and 300 ml of dichloromethane are introduced into a two-necked round-bottomed flask. The mixture is placed under stirring at 0° C. and 8.22 g of meta-chloroperbenzoic acid in solution in 75 ml of chloroform are then introduced dropwise using a dropping funnel. The mixture is subsequently left stirring at ambient temperature for 4 h. At the end of the reaction, the copolymer is precipitated twice from 2 liters of ethanol and then dissolved in dichloromethane. The solvent is then completely removed by evaporation under vacuum. The final product is a translucent viscous liquid obtained with a yield of 96%. It is analysed by $^1$H NMR.

The $^1$H NMR spectrum makes it possible to quantify the microstructure within the copolymer by integration of signals characteristic of the protons 1 and 2 which appear in the form of broad unresolved peaks:

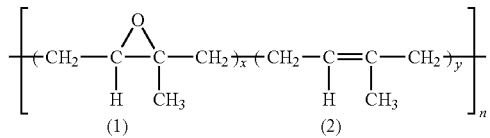

| Proton No. | Chemical shift (ppm) | Number of protons |
|---|---|---|
| H2 | 2.72 | 1 |
| H1 | 4.64-5.28 | 1 |

The molar composition of the copolymer is as follows: 4.1 mol % of epoxide and 95.9 mol % of isoprene. The molar mass of the copolymer is 30 210 g/mol. There are approximately 18 epoxide functional groups per chain.

3—Preparation of Polymers Bearing Pendant Hydroxyaryl Groups Along the Chain:

Example 2

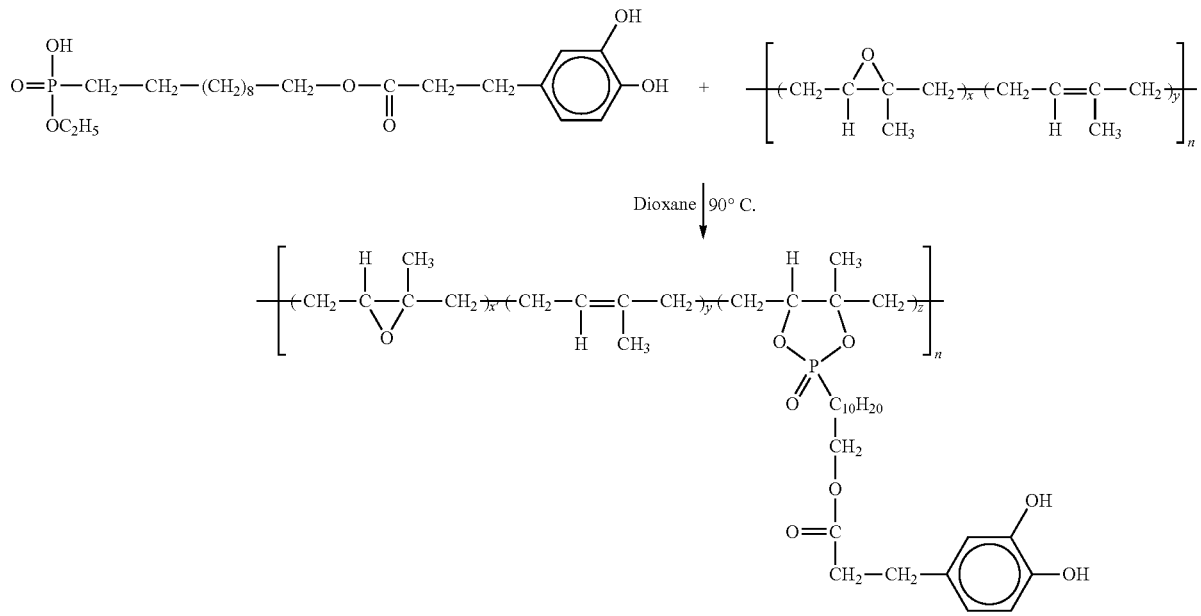

18 g of epoxidized polyisoprene, 4.82 g of 11-[ethoxy (hydroxy)phosphoryl]undecyl 3-(3,4-dihydroxyphenyl)propanoate and 50 ml of dioxane are introduced into a single-necked round-bottomed flask. The reaction medium is stirred magnetically and heated at 90° C. for 24 hours. At the end of the reaction, the terpolymer is precipitated twice from methanol and then dissolved in dichloromethane. The solvent is then completely removed by evaporation under vacuum. The final product is a translucent yellow polymer obtained with a yield of 91%. It is analysed by $^1$H and $^{31}$P NMR.

The $^1$H NMR spectrum makes it possible to quantify the microstructure within the copolymer by integration of signals characteristic of the protons 1 to 9 which appear in the form of broad unresolved peaks:

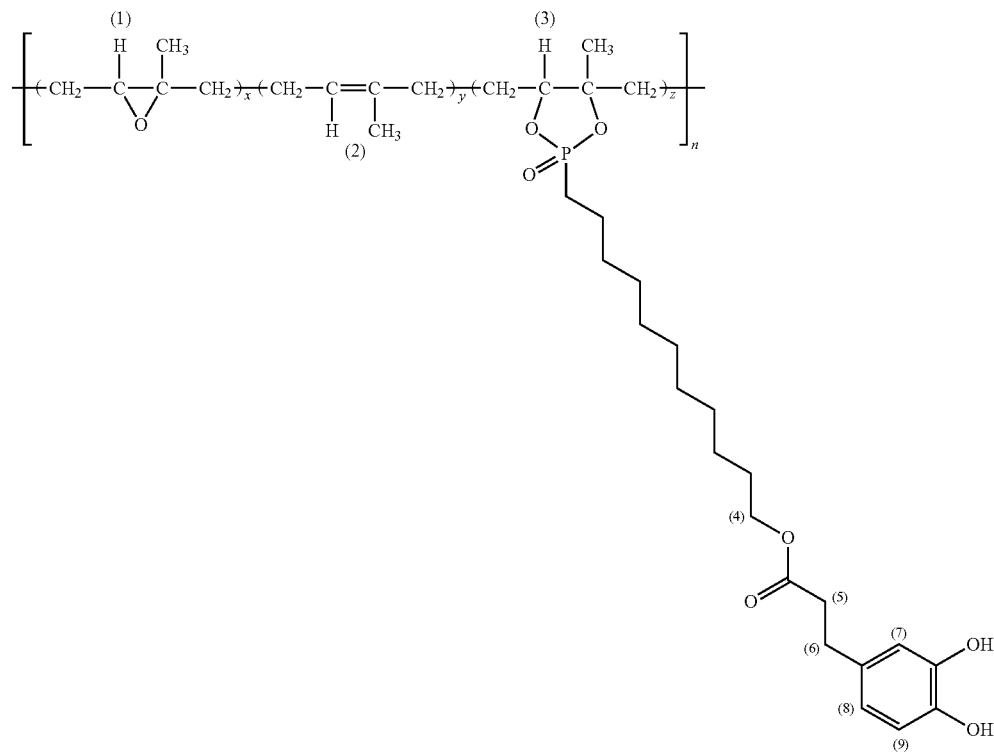

| Proton No. | Chemical shift (ppm) | Number of protons |
|---|---|---|
| H5 | 2.59 | 2 |
| H1 | 2.72 | 1 |
| H6 | 2.84 | 2 |
| H4 | 4.08 | 2 |
| H3 | 4.33 | 1 |
| H2 | 4.64-5.28 | 1 |
| H7 H8 H9 | 6.54-6.84 | 3 |

The $^{31}$P NMR spectrum makes it possible to observe the signal characteristic of the grafted phosphorus at 47.7 ppm.

The molar composition of the terpolymer is as follows: 96.5 mol % of isoprene, 2.5 mol % of catechol and 1 mol % of residual epoxide. The molar mass of the copolymer is 35 070 g/mol. There are approximately 11 catechol functional groups per chain.

The invention claimed is:

1. A process for the synthesis of a polymer bearing at least one pendant hydroxyaryl group, which process comprises the reaction of a starting polymer bearing at least one epoxide functional group with a nucleophilic compound simultaneously bearing the hydroxyaryl group and bearing a nucleophilic functional group selected from the group consisting of the phosphonic acid functional group and its ionic form.

2. A process according to claim 1, in which the hydroxyaryl group is an aryl group which bears two hydroxyl functional groups directly bonded to the benzene ring.

3. A process according to claim 1, in which the nucleophilic functional group is the phosphonic monoacid functional group.

4. A process according to claim 3, in which the nucleophilic functional group is the P(O)(OR)(OH) group, and R is an alkyl.

5. A process according to claim 1, in which the nucleophilic compound corresponds to the following formula (I):

A-B—X        (I)

in which:
A represents a nucleophilic functional group selected from the group consisting of the phosphonic acid functional group and its ionic form,
B is a "spacer" representing an atom or a group of atoms forming a connection between A and X,
X represents an aryl group bearing from 1 to 5 hydroxyl functional groups directly bonded to the benzene ring.

6. A process according to claim 5, in which B in the formula (I) represents a divalent hydrocarbon chain which can be substituted or interrupted by at least one heteroatom.

7. A process according to claim 5, in which X in the formula (I) represents:

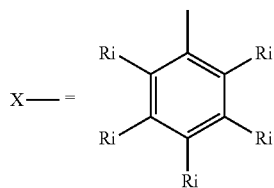

in which the Ri groups, which are identical or different, represent a hydrogen atom or a hydroxyl group, at least one of the Ri groups representing a hydroxyl group.

8. A process according to claim 7, in which two Ri groups each represent a hydroxyl group, the other Ri groups each representing a hydrogen atom.

9. A process according to claim 8, in which X in the formula (I) represents an aryl group substituted on two neighbouring carbon atoms by two hydroxyl functional groups.

10. A process according to claim 9, in which X in the formula (I) represents:

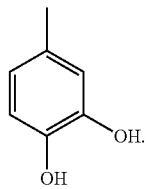

11. A process according to claim 10, in which the nucleophilic compound corresponds to the formula:

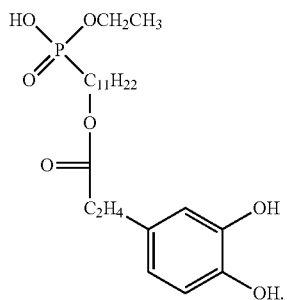

12. A process according to claim 1, in which the two carbon atoms of the epoxide functional group are in the main chain of the starting polymer.

13. A process according to claim 12, in which the starting polymer contains 1,4-diene units, a portion of which is epoxidized.

14. A process according to claim 13, in which the 1,4-diene units are 1,4-butadiene or 1,4-isoprene units.

15. A process according to claim 13, in which the starting polymer containing 1,4-diene units results from the epoxidation of a portion of a polymer selected from the group consisting of polybutadienes, polyisoprenes, 1,3-butadiene copolymers, isoprene copolymers and the mixtures of these polymers; and a portion of the 1,4-diene units of the starting polymer is epoxidized.

16. A process according to claim 1, in which the epoxide functional group is pendant.

17. A process according to claim 16, in which the starting polymer is a polymer at least of a first monomer bearing the epoxide functional group.

18. A process according to claim 17, in which the starting polymer is a polymer at least of a first monomer bearing the epoxide functional group and of a second monomer.

19. A process according to claim 18, in which the second monomer is a vinyl monomer chosen from:
ethylene,
α-olefins,
(meth)acrylonitrile,
(meth)acrylates,
vinyl esters of carboxylic acids,
vinyl alcohol,
vinyl ethers,
and the mixtures of these monomers.

20. A process according to claim 18, in which the second monomer is ethylene.

21. A process according to claim 18, in which the second monomer is an α-monoolefin, a conjugated diene or a non-conjugated diene.

22. A process according to claim 21, in which the second monomer is 1,3-butadiene, isoprene, their mixture or styrene.

23. A process according to claim 18, in which the starting polymer is a polymer at least of a first monomer bearing the epoxide functional group, of ethylene or of an α-olefin and of a third monomer, which third monomer is a vinyl monomer chosen from:
   ethylene,
   α-olefins,
   (meth)acrylonitrile,
   (meth)acrylates,
   vinyl esters of carboxylic acids,
   vinyl alcohol,
   vinyl ethers,
   and the mixtures of these monomers.

24. A process according to claim 17, in which the first monomer bearing the epoxide functional group is a monomer bearing an epoxide functional group.

25. A process according to claim 24, in which the first monomer is a monomer bearing a glycidyl group, and the first monomer is a glycidyl ester of an α,β-unsaturated carboxylic acid.

26. A process according to claim 16, in which the starting polymer is obtained by postpolymerization modification of an unsaturated polymer by an epoxidized compound.

27. A process according to claim 26, in which the unsaturated polymer is one of the diene elastomers (a) to (e):
   (a) a homopolymer of a conjugated diene monomer having from 4 to 12 carbon atoms,
   (b) a copolymer of a conjugated diene monomer having from 4 to 12 carbon atoms,
   (c) a homopolymer of a non-conjugated diene monomer having from 5 to 12 carbon atoms,
   (d) a copolymer of a non-conjugated diene monomer having from 5 to 12 carbon atoms,
   (e) a mixture of the polymers defined in (a) to (d).

28. A process according to claim 27, in which the unsaturated polymer is a diene elastomer selected from the group consisting of polybutadienes, polyisoprenes, butadiene copolymers, isoprene copolymers and their mixtures.

29. A process according to claim 1, in which the content of epoxide functional group in the starting polymer is at least 0.1 mol per 100 mol of monomer units constituting the starting polymer.

30. A polymer bearing at least one pendant hydroxyaryl group capable of being obtained by the synthesis process defined according to claim 1.

31. A polymer according to claim 30, which polymer is an elastomer.

32. A rubber composition based at least on a reinforcing filler and on a polymer defined according to claim 30.

33. A tire which comprises a rubber composition according to claim 32.

34. A process according to claim 25, wherein the first monomer is glycidyl methacrylate, glycidyl acrylate or glycidyl itaconate.

* * * * *